(12) United States Patent
Yamamoto et al.

(10) Patent No.: US 7,546,014 B2
(45) Date of Patent: Jun. 9, 2009

(54) OPTICAL DIRECTIONAL COUPLER

(75) Inventors: Rei Yamamoto, Tsukuba (JP); Nobuo Miyadera, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 11/605,289

(22) Filed: Nov. 29, 2006

(65) Prior Publication Data

US 2007/0122080 A1    May 31, 2007

(30) Foreign Application Priority Data

Nov. 30, 2005    (JP)    ............................. 2005-346180

(51) Int. Cl.
*G02B 6/42*    (2006.01)
(52) U.S. Cl. .............................. 385/43; 385/39; 385/42
(58) Field of Classification Search .................... 385/41, 385/42, 43, 45, 46, 20, 21
See application file for complete search history.

(56) References Cited

U.S. PATENT DOCUMENTS

| 4,151,747 | A | * | 5/1979 | Gottlieb et al. ............. 374/161 |
| 5,526,453 | A | * | 6/1996 | Wolf et al. ..................... 385/42 |
| 6,134,362 | A | * | 10/2000 | Au-Yeung et al. ............ 385/43 |
| 6,272,268 | B1 | * | 8/2001 | Miller et al. .................. 385/43 |
| 6,907,152 | B2 | * | 6/2005 | Takahashi et al. ............. 385/15 |

FOREIGN PATENT DOCUMENTS

| JP | 06-308338 | 11/1994 |
| JP | 09-178967 | * 11/1997 |

* cited by examiner

*Primary Examiner*—Charlie Peng
(74) *Attorney, Agent, or Firm*—Antonelli, Terry, Stout & Kraus, LLP.

(57) ABSTRACT

An optical directional coupler (1) comprises first and second straight optical waveguides (2, 3) having respective cores (2a, 3a) extending longitudinally close to each other to form an optical coupler portion, and a tapered optical waveguide (4) having a core (4a) connected to the core (2a) of the first straight waveguide (2). The core (2a) of the first straight waveguide (2) has a centerline (2d). A width of the core (4a) of the tapered waveguide (4) becomes narrow toward the first straight waveguide (2) and a profile of the tapered waveguide (4) is asymmetric relative to the centerline (2d) of the core (2a) of the first straight waveguides (2).

16 Claims, 5 Drawing Sheets

FIG. 8 Background
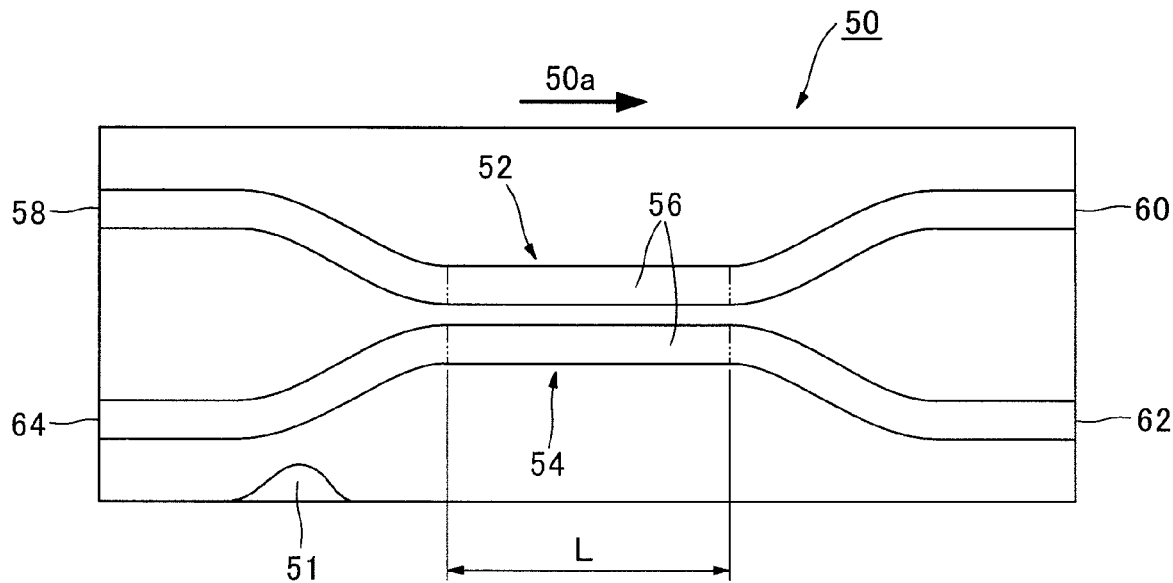
FIG. 9
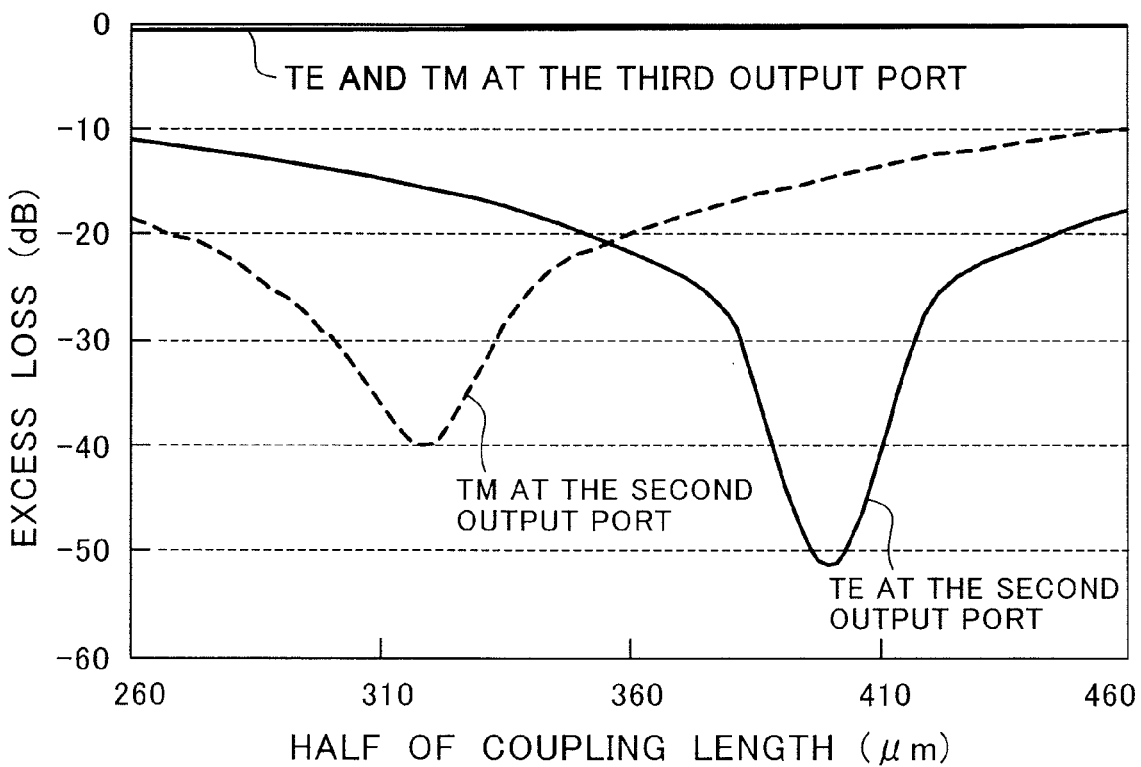

OPTICAL DIRECTIONAL COUPLER

FIELD OF THE INVENTION

The present invention relates to an optical coupler and in particular to an optical directional coupler.

BACKGROUND OF THE INVENTION

A representative optical directional coupler known conventionally is shown in FIG. 8. FIG. 8 is a schematic plan view of an optical directional coupler in the prior art. An optical directional coupler 50 shown in FIG. 8 has a substrate 51 disposed parallel to a plane where FIG. 8 is drawn, a first optical waveguide 52 and a second optical waveguide 54, these waveguides being composed on the substrate 51. The first and second waveguides 52, 54 have respective straight portions 56 disposed close to each other in a direction perpendicular to a light-transmitting direction 50a and defining an optical coupler portion. The first waveguide 52 has a first input port 58 and a second output port 60 while the second waveguide 54 has a third output port 62 and a forth input port 64. A coupling length L of the optical directional coupler 50 is considered hereinafter to be a length of the straight portion 56.

When light is transmitted from the first input port 58, locations where light strength is relatively strong exist alternately in the first and second waveguides 52, 54 along the transmitting direction 50a at a constant interference cycle or pitch. For example, in a condition in which a coupling length is determined so that light strength is relatively strong at the end of the second waveguide 54, most of the light is transmitted to the third output port 62 while a portion of the light is leaked to the second output port 60 as crosstalk. Thus, in an optical directional coupler, a splitting or branch ratio between lights output to the second and third output ports 60, 62 can be selected by adjusting or changing the coupling length. Light has polarized wave components TE, TM, the former being parallel to the substrate while the latter being perpendicular thereto.

FIG. 9 is a graph showing amounts of crosstalk of the respective polarized wave components. In FIG. 9, a horizontal axis indicates half of the coupling length L while a vertical axis indicates an amount of crosstalk or excess loss. FIG. 9 is a graph showing a state where most of the light transmitted from the first input port 58 is output to the third output port 62. In this state, since light output to the second output port 60 is crosstalk, excess loss at the second output port 60 is preferably large, i.e., an absolute value in a negative decibel value of excess loss is preferably large, while excess loss at the third output port 62 is preferably small, i.e., a decibel value thereof is preferably close to zero. As can be seen from FIG. 9, values of excess loss of the polarized wave components TE, TM at the third output port 62 do not substantially change when the coupling length L is changed. On the contrary, values of excess loss (crosstalk) of the polarized wave components TE, TM at the second output port 60 are affected by a difference between phases of the polarized wave components because a very small amount of light is transmitted to the second output port 60. For example, when a coupling length is selected to minimize a value of excess loss of the polarized wave component TE, a value of excess loss of the polarized wave component TM cannot be the smallest. Thus, it is impossible for values of excess loss of the both of the polarized wave components TE, TM at the second output port 60 to be smaller than −25 dB.

Patent Publication 1 indicated below discloses an optical directional coupler having straight waveguides close to each other, in which widths of the straight waveguides are different from each other in order to reduce fluctuation of excess loss due to a difference in the types of polarized wave. Further, on the opposite sides of the narrower straight waveguide, tapered optical waveguide portions for conforming widths of the tapered waveguide to those of the input and output ports are provided coaxial to the narrower straight waveguide.

Patent Publication 1: Japanese Patent Laid-open Publication No. 6-308338 (Please refer to FIG. 1) An amount of the above-stated crosstalk is desirably as small as possible. In order to reduce the amount of crosstalk, phases of the polarized wave components TE, TM should be brought close to each other.

Further, in the optical directional coupler disclosed in Patent Publication 1, since widths of the straight waveguides thereof close to each other are different from each other and thus the optical directional coupler is asymmetric, it is difficult to make an optical circuit with a splitting or branch ratio of 0:100% in which all light input from the first input port 58 is transmitted to the third output port 62. Namely, when directional couplers having a splitting or branch ratio of a few tens % in a broad frequency range are required to be made with a great yield ratio, such a directional coupler, in which widths of the straight waveguides are different from each other as disclosed in Patent Publication 1, is selected. Although such a directional coupler has a property depending on the type of polarized wave, an influence thereof is very small because an amplitude of a strength-transition curved line (sinusoidal curved line) of transmitting-light is made small and upper and lower peaks of the amplitude are utilized. Namely, a structure in which widths of the straight waveguides are different from each other is only a little affected by the type of polarized wave and interference lengths or pitches themselves which differ depending on the type of polarized components, and thus these lengths or pitches are not adjustable.

It is therefore an object of the present invention to provide an optical directional coupler which enables a phase property of polarized wave components of transmitting-light to be changed.

SUMMARY OF THE INVENTION

To achieve the above object, an optical directional coupler according to the present invention comprises two straight optical waveguides having respective cores extending longitudinally close to each other to form an optical coupler portion, each core of each straight waveguide having a centerline; and a tapered optical waveguide having a core connected to the core of at least one of the straight waveguides; wherein a width of the core of the tapered waveguide becomes narrow toward the at least one of the straight waveguides and a profile of the tapered waveguide is asymmetric relative to the centerline of the core of the at least one of the straight waveguides.

In this optical directional waveguide, light transmitted through the tapered waveguide enters one of the two straight waveguides close to each other to form the optical coupler portion and then is transmitted in a way so as to alternately cross over these two straight waveguides according to a predetermined interference cycle or pitch. The light has two polarized components perpendicular to each other. By employing a structure having two such straight waveguides with cores extending longitudinally close to each other to form an optical coupler portion and such a tapered waveguide asymmetric relative to a centerline of the core of one of the straight waveguides, and by adjusting a width of each core of the two straight waveguides and a distance between the cores of the straight waveguides, a difference between phases of the two polarized components of transmitting-light can be changed so that a phase property of the polarized components of the transmitting-light is changed. As a result, a fluctuation of excess loss due to the types of polarized components can be reduced.

In the optical directional coupler according to the present invention, preferably, the width of each core of the straight waveguides and the distance between the cores of the two straight waveguides are determined by a V-parameter V and a coupling coefficient K.

In this optical directional coupler, when a wavelength of the transmitting-light is changed, the width of each core of the straight waveguides and the distance between the cores thereof can be easily determined.

In the optical directional coupler, at least a portion of a boundary line of the tapered optical waveguide may be a straight or curved line.

The optical directional coupler according to the present invention enables a phase property of polarized wave components of transmitting-light to be changed.

BRIEF DESCRIPTION OF THE DRAWINGS

In the accompanying drawings:

FIG. 8 is a schematic plan view of an optical directional coupler in the prior art; and FIG. 9 is a graph showing a value of crosstalk of each of the polarized wave components in the optical directional coupler in the prior art.

DETAILED DESCRIPTION OF THE PREFERRED EMBODIMENTS

Figure 1:
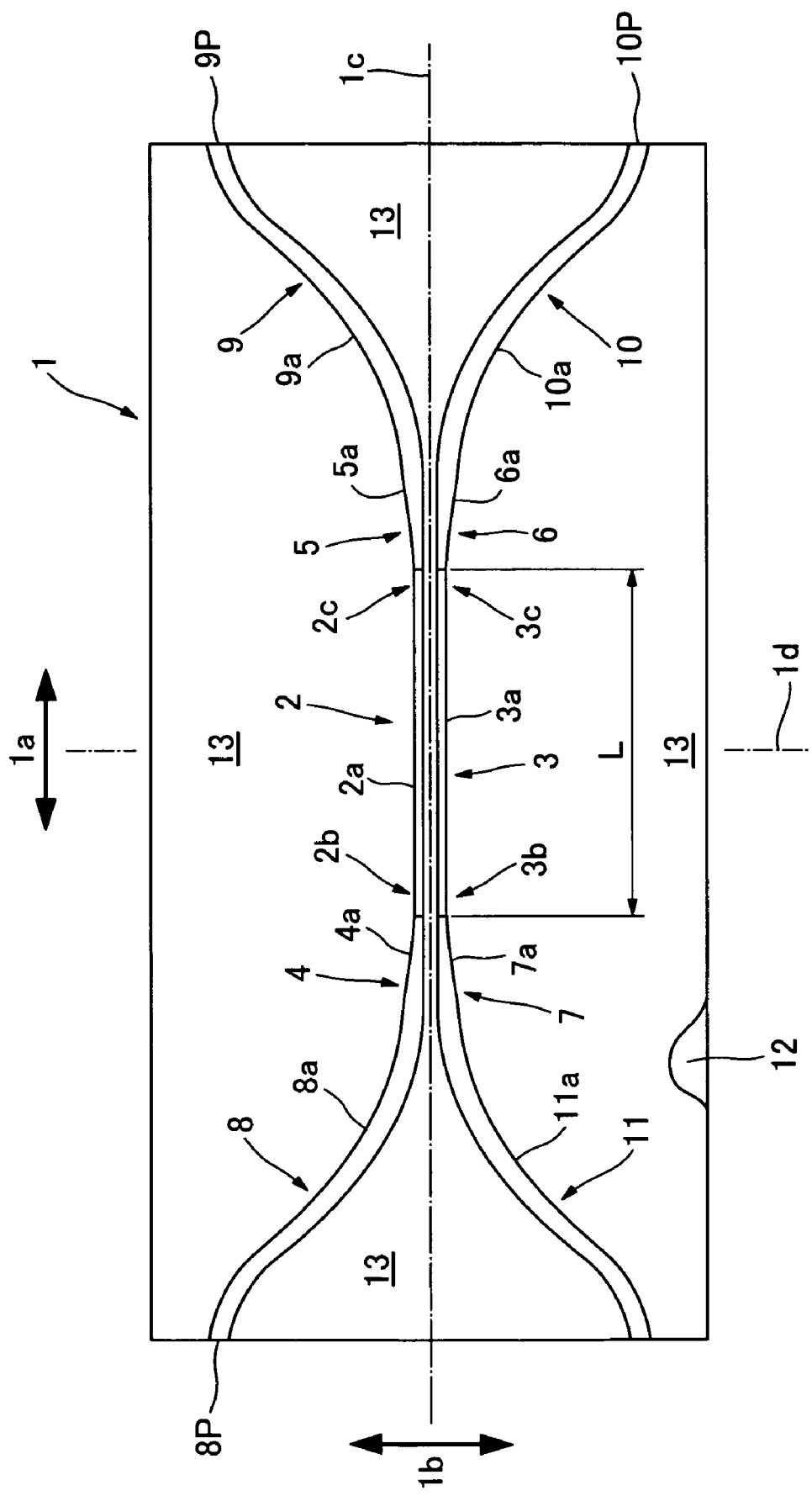
FIG. 1 is a schematic plan view of an optical directional coupler which is a first embodiment of the present invention.

Now, referring to Figures, a first embodiment of an optical directional coupler according to the present invention will be explained. FIG. 1 is a schematic plan view of an optical directional coupler which is a first embodiment of the present invention.

As shown in FIG. 1, an optical directional coupler 1 has two straight optical waveguides 2, 3 extending in a longitudinal direction 1a and disposed close to each other to form an optical coupler portion, and four curved optical waveguides which are four input/output optical waveguides 8, 9, 10, 11 connected to the opposed sides of the two straight waveguides 2, 3 via tapered optical waveguides 4, 5, 6, 7. These waveguides 2-11 are composed on a substrate 12 disposed parallel to a plane in which FIG. 1 is drawn. Specifically, the waveguides 2-11 have respective cores 2a-11a and a clad 13 disposed around the cores 2a-11a. The cores 2a-11a and the clad 13 are composed, for example, polymer on the substrate 12 made of, for example, silicon or glass. One end 2b of the core 2a of the first straight waveguide 2 is connected to the core 8a of the first curved waveguide 8 via the core 4a of the tapered waveguide 4, while another end 2c of the core 2a is connected to the core 9a of the second curved waveguide 9 via the core 5a of the tapered waveguide 5. Similarly, one end 3c of the core 3a of the second straight waveguide 3 is connected to the core 10a of the third curved waveguide 10 via the core 6a of the tapered waveguide 6, while another end 3b of the core 3a is connected to the core 11a of the fourth curved waveguide 11 via the core 7a of the tapered waveguide 7. The first curved waveguide 8 has a first input port 8p, while the second curved waveguide 9 and the third curved waveguide 10 respectively have a second output port 9p and a third output port 10p. Further, in the present embodiment, a coupling length L of the optical coupling portion is regarded as a length of the first and second straight waveguides 2, 3. The first curved waveguide 8 and the fourth curved waveguide 11 are disposed on the same side of the coupler in the longitudinal direction 1a.

The optical directional coupler 1 in the present embodiment is formed symmetric relative to an axis 1c extending in the longitudinal direction 1a and relative to an axis 1d extending in a width direction 1b perpendicular to the longitudinal direction 1a. Thus, only the first curved waveguide 8, the tapered waveguide 4 and the first straight waveguide 2 will be explained by referring to FIG. 2, and explanations of the other waveguides are omitted.

Figure 2:
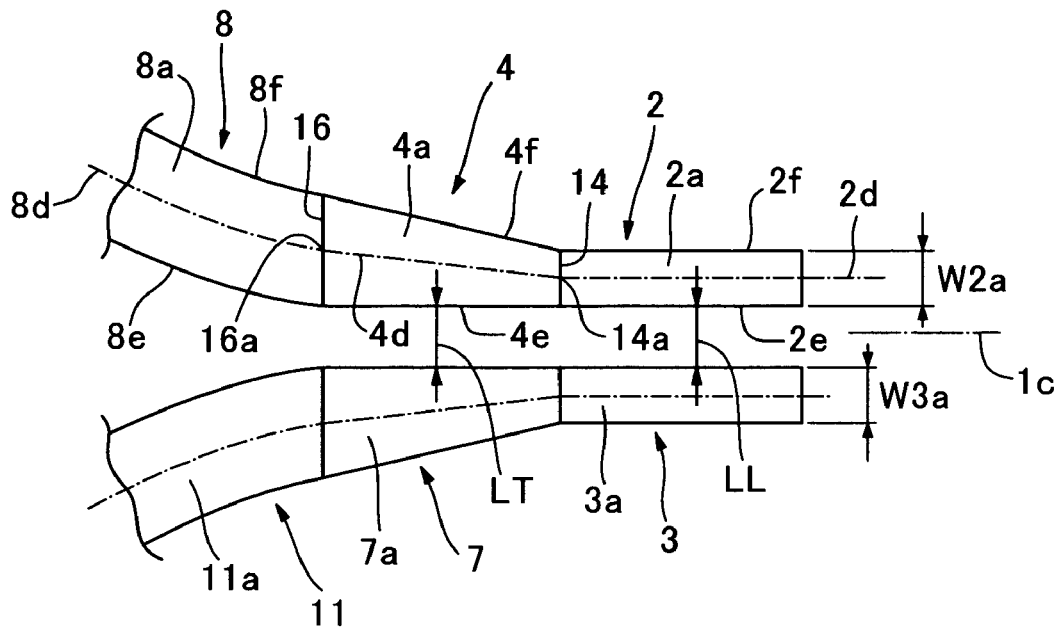
FIG. 2 is a partially expanded view of the optical directional coupler which is the first embodiment of the present invention.

FIG. 2 is an expanded schematic plan view of the tapered waveguide 4 and the vicinity thereof. As shown in FIG. 2, a width of the core 4a of the tapered waveguide 4 becomes narrow toward the first straight waveguide 2. Namely, a width of the core 2a of the first straight waveguide 2 is narrower than that of the core 8a of the curved waveguide 8. In the present embodiment, respective widths W2a, W3a of the cores 2a, 3a of the first and second straight waveguides 2, 3 are the same and respective widths of the cores 8a-11a of the curved waveguides 8-11 are the same.

The core 2a of the first straight waveguide 2 has a centerline 2d, a boundary line 2e on a second-straight-waveguide side, and a boundary line 2f on a side opposed thereto, namely, a first-straight-waveguide side. Further, the core 4a of the tapered waveguide 4 has boundary lines 4e, 4f respectively connected to the boundary lines 2e, 2f of the first straight waveguide 2, while the core 8a of the curved waveguide 8 has boundary lines 8e, 8f respectively connected to the boundary lines 4e, 4f of the tapered waveguide 4.

The boundary lines 2e, 2f of the straight waveguide 2 are straight lines. Further, the core 4a has a planar profile asymmetric relative to the centerline 2d of the core 2a of the first straight waveguide 2. Specifically, the boundary lines 4e, 4f of the tapered waveguide 4 are straight lines. The boundary line 4e is disposed on the same straight line as that which the boundary line 2e of the first straight waveguide 2 is disposed on, while the boundary line 4f is connected to the boundary line 2f at a certain angle.

Further, a first imaginary partition line 14 which corresponds to an optical connecting surface between the core 2a of the straight waveguide 2 and the core 4a of the tapered waveguide 4, and a second imaginary partition line 16 which corresponds to an optical connecting surface between the core 4a of the tapered waveguide 4 and the core 8a of the curved waveguide 8 are provided. A line connecting the midpoint 14a of the first partition line 14 to the midpoint 16a of the second partition line 16 defines a centerline 4d of the core 4a of the tapered waveguide 4. The centerline 4d of the core 4a is connected to the centerline 2d of the core 2a of the straight waveguide 2 at a certain angle. Further, an inclination of a tangential line of the centerline 8d of the core 8a of the curved waveguide 8 at the optical connecting surface 16 preferably conforms to an inclination of the centerline 4d of the core 4a of the tapered waveguide 4 in order to conform a wave surface of light transmitted from the curved waveguide 8 and that of light transmitted to the tapered waveguide 4 to each other.

The second straight waveguide 3, the fourth curved waveguide 11 and the tapered waveguide 7 between there are respectively formed symmetric to the first straight waveguide 2, the first curved waveguide 8 and tapered waveguide 4 relative to the axis 1c. A distance LL in the width direction 1b between the core 2a of the first straight waveguide 2 and the core 3a of the second straight waveguide 3 and a distance LT in the width direction 1b between the core 4a of the tapered waveguide 4 and the core 7a of the tapered waveguide 7 are constant along the direction of the axis 1c.

A first way of determining a core width W2a of the core 2a of the first straight waveguide 2 and the distance LL in the width direction 1b between the core 2a of the first straight waveguide 2 and the core 3a of the second straight waveguide 3 is by trial and error so that a desired phase property of polarized wave components of light to be transmitted is obtained. For example, when light having a wavelength of 1550 nm is transmitted through the optical directional coupler, the core width W2a and the distance LL are respectively determined as 3 μm and 3.5 μm by trial and error so that the phases of the respective polarized wave components of the transmitting-light are the same.

A second way of determining the core width W2a and the distance LL is by calculating them by using a V-parameter V and a coupling coefficient K which are obtained by normalized optical waveguide parameters. The V-parameter V is represented by equation 1 and the coupling coefficient K is represented by equation 2;

$$V = \frac{2\pi}{\lambda} n_1 \frac{(W2a)}{2} \sqrt{2\Delta} ;$$ (equation 1)

and $$K = \frac{\kappa^2}{\beta} \frac{1}{\gamma \frac{(W2a)}{2}} \frac{\exp(-\gamma LL)}{1 + \left(\frac{\kappa}{\gamma}\right)^3}.$$ (equation 2)

In equations 1 and 2, $\lambda$ is a wavelength of light to be transmitted, $n_1$ is a value of refractive index of the core 2a, W2a is the width of the core 2a of the straight waveguide 2, $\Delta$ is a value of relative index difference, $\beta$ is a value of mode propagation constant when it is assumed that one of the two straight waveguides 2, 3 exists alone, and LL is the distance between the cores 2a, 3a of the two straight waveguides 2, 3. In equation 2, $\kappa$ and $\gamma$ are represented as follows;

$$\kappa = \sqrt{k_0^2 n_1^2 - \beta^2}$$ (equation 3);

and $$\gamma = \sqrt{\beta^2 - k_0^2 n_3^2}$$ (equation 4);

wherein $k_0 = 2\pi/\lambda$. In equations 3 and 4, $n_3$ is a value of refractive index of a material (clad) 13 intervened between the cores 2a, 3a of the two straight waveguides 2, 3.

An example of the above-stated second way will be explained concretely. Firstly, a core width W2a and a distance LL relative to a certain wavelength $\lambda$ are determined by trial and error.

Secondly, values of the respective optical waveguide parameters, namely, the wavelength $\lambda$, the core width W2a, the value of refractive index $n_1$ of the core and the value of relative index difference $\Delta$ are incorporated into the equation 1 to calculate the value of V-parameter V. For example, when the wavelength $\lambda$ is 1550 nm, by incorporating the values of W2a of 3 μm, $n_1$ of 1.527 and $\Delta$ (0.4%) into the equation 1, the value of V-parameter V of 0.82 can be calculated. Then, in order to calculate a core width W2a at another wavelength different from the above-stated wavelength, the values of the calculated V-parameter V, refractive index $n_1$ of the core and relative index difference $\Delta$ are incorporated into the equation 1. For example, when a wavelength $\lambda$ transmitted through the optical directional coupler is 1310 nm, by incorporating the values of V-parameter V of 0.82, refractive index $n_1$ of the core at the wavelength of 1310 nm and relative index difference $\Delta$ (0.4%) into the equation 1, the core width W2a of 2.5 μm can be calculated.

Further, values of the parameters regarding the waveguide, namely, the core width W2a and the distance LL at the above-stated certain wavelength, the value of mode propagation constant $\beta$, the value of refractive index $n_1$ of the core and a value of refractive index $n_3$ of the clad are incorporated into the equations 2-4 to calculate a value of coupling coefficient K. For example, when the wavelength is 1550 nm, the values of W2a of 3 μm, LL of 3.5 μm, $\beta$ of 6.17, $n_1$ of 1.527 and $n_3$ of 1.521 are incorporated into the equations 2-4 and then the value of coupling coefficient K of 0.0092 can be calculated. Then, in order to calculate the distance LL at the other wavelength, the calculated value of coupling coefficient K, the calculated core width W2a, and the values of mode propagation constant $\beta$, the value of refractive index $n_1$ of the core and the value of refractive index $n_3$ of the clad are incorporated into the equations 2-4. For example, when the wavelength $\lambda$ transmitted to the optical directional coupler is 1310 nm, the values of coupling coefficient K of 0.0092 and W2a of 3 μm, and the same values of $\beta$, $n_1$ and $n_3$ as those previously used are incorporated into the equations 2-4 and then the distance LL can be calculated.

If values of V-parameter V and coupling coefficient K are already known, determining the core width W2a and the distance LL by trial and error can be omitted.

Next, an operation of the optical directional coupler of the first embodiment according to the present invention will be explained.

When light is input into the first curved waveguide 8, it is transmitted through the tapered waveguide 4 to the straight waveguide 2. Then, the light is transmitted longitudinally while it alternately crosses over between the two straight waveguides 2, 3 in accordance with a determined interference cycle or pitch, and the light is output from the second curved waveguide 9 and/or the third curved waveguide 10.

In the optical directional coupler in which a planar profile of the tapered waveguide 4 is asymmetric relative to the centerline 2d of the core 2a of the straight waveguide 2, or in which the centerline 4d of the core 4a of the tapered waveguide 4 is inclined to the centerline 2d of the core 2a of the straight waveguide 2 at a certain angle and the shape of the straight waveguide 2 is determined by trial and error or by means of the V-parameter and the coupling coefficient K, when light is input from the tapered waveguide 4 into the straight waveguide 2, a difference between a phase of a polarized component TE parallel to the substrate 12 and that of the other polarized component TM perpendicular thereto is changed. For example, such a difference between the phases of the polarized components TE, TM can be small. Namely, a phase property of the polarized components of transmitting-light can be changed.

As a result, for example, when light is transmitted from the first curved waveguide 8 to the third curved waveguide 10, phases of the polarized components TE, TM can be conformed to each other at the output of the second curved waveguide 9 and thus an amount of crosstalk can be reduced.

Not only regarding a phase property of an optical directional coupler having a core width W2a and a distance LL which is determined by trial and error, but also regarding a phase property of an optical directional coupler having a core width W2a and a distance LL which is calculated by using the values of V-parameter and coupling coefficient K which are normalized, the phases of the polarized components TE, TM can be conformed to each other at the output of the second curved waveguide 9. Thus, a shape of an optical coupling portion depending on a wavelength of light to be transmitted through the optical directional coupler can be determined by using the values of the normalized V-parameter and coupling coefficient K.

Further, at the optical connecting surface 16 between the curved waveguide 8 and the tapered waveguide 4, inclination of the centerline 8d of the core 8a of the curved waveguide 8 is conformed to that of the centerline 4d of the core 4a of the waveguide 4, whereby a wave surface of light transmitted from the curved waveguide 8 and that of light transmitted to the tapered waveguide 4 are conformed to each other. Thus, loss caused when light is transmitted from the curved waveguide 8 to tapered waveguide 4 can be reduced.

Next, second and third embodiments of an optical directional coupler according to the present invention will be explained. Since the second and third embodiments are similar to the first embodiment of the present invention except mainly for the planar profile of the tapered waveguide 2, only portions of the former different from those of the latter will be explained.

Figure 3:
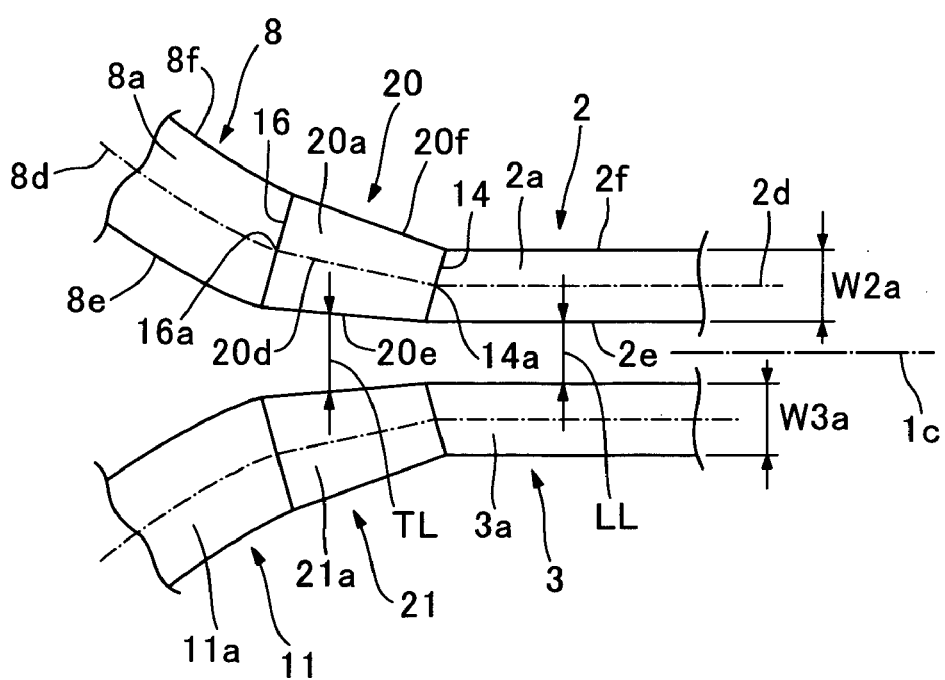
FIG. 3 is a partially expanded view of an optical directional coupler which is a second embodiment of the present invention.

FIG. 3 is a plan view of tapered waveguides and the vicinity thereof of an optical directional coupler which is the second embodiment of the present invention. As shown in FIG. 3, the tapered waveguide 20 has a core 20a and boundary lines 20e, 20f respectively connected to the boundary lines 2e, 2f of the straight waveguide 2. The core 20a of the tapered waveguide 20 has a planar profile asymmetric relative to the centerline 2d of the core 2a of the straight waveguide 2. Concretely, the boundary lines 20e, 20f of the tapered waveguide 20 are straight lines and are respectively connected to the boundary lines 2e, 2f of the straight waveguide 2 at respective certain angles. The boundary line 20e of the tapered waveguide 20 may be connected so that it becomes close to or far from the axis 1c toward the first curved waveguide 8. The boundary line 20e is preferably connected so that it becomes far from the axis 1c to provide a stable splitting ratio, as shown in FIG. 3.

Further, a first imaginary partition line 14 is provided between the core 2a of the straight waveguide 2 and the core 20a of the tapered waveguide 20, a second imaginary partition line 16 is provided between the core 20a of the tapered waveguide 20 and the core 8a of the curved waveguide 8, and a centerline 20d of the core 20a of the tapered waveguide 20 is defined by a straight line connecting the midpoint 14a of the first partition line 14 to the midpoint 16a of the second partition line 16. A centerline 20d of the core 20a of the tapered waveguide 20 is connected to the centerline 2d of the core 2a of the straight waveguide 2 at a certain angle.

The straight waveguide 3, the fourth curved waveguide 11 and the tapered waveguide 21 between there are respectively symmetric to the first straight waveguide 2, the first curved waveguide 8 and the tapered waveguide 21 relative to the axis 1c. A distance LL between the core 2a of the first straight waveguide 2 and the core 3a of the second straight waveguide 3 in the width direction 1b is constant along the axis 1c. When a distance LT between the core 20a of the tapered waveguide 20 and the core 21a of the tapered waveguide 21 in the width direction 1b is too narrow, an interference length or pitch tends to be random. Thus, to obtain a stable interference length or pitch, the distance LT is preferably equal to or greater than the distance LL. Further, in order to obtain a stable splitting ratio, the distance LT preferably increases toward the first curved waveguide 8 and the fourth curved waveguide 11.

Figure 4:
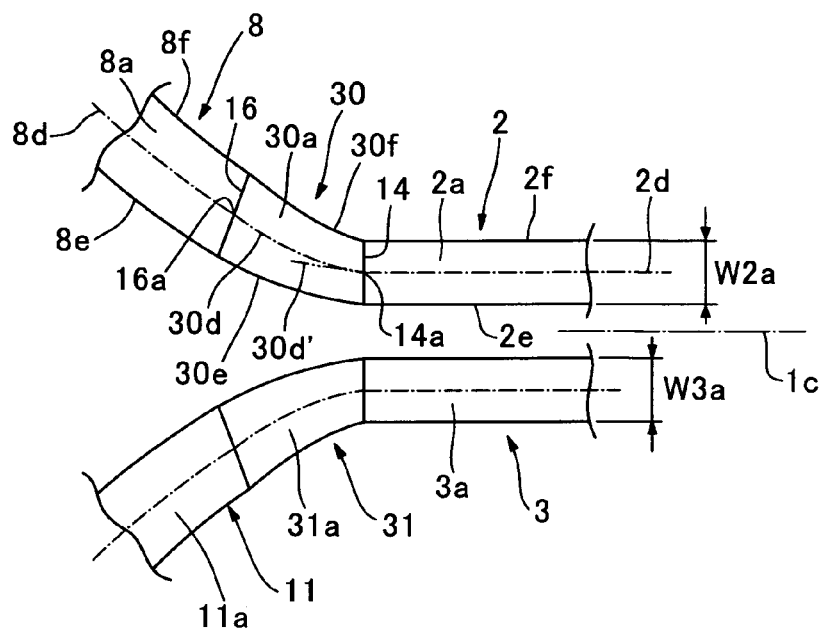
FIG. 4 is a partially expanded view of an optical directional coupler which is the third embodiment of the present invention.

FIG. 4 is a plan view of tapered waveguides and the vicinity thereof of an optical directional coupler which is the third embodiment of the present invention. As shown in FIG. 4, the tapered waveguide 30 has a core 30a and boundary lines 30e, 30f respectively connected to the boundary lines 2e, 2f of the straight waveguide 2. The core 30a of the tapered waveguide 30 has a planar profile asymmetric relative to the centerline 2d of the core 2a of the straight waveguide 2. Concretely, the boundary lines 30e, 30f of the tapered waveguide 30 are curved lines curved in the same direction.

Further, a first imaginary partition line 14 is provided between the core 2a of the straight waveguide 2 and the core 30a of the tapered waveguide 30, a second imaginary partition line 16 is provided between the core 30a of the tapered waveguide 30 and the core 8a of the curved waveguide 8, and a centerline 30d of the core 30a of the tapered waveguide 30 is defined by a curved line connecting the midpoints in the width direction along the tapered waveguide 30. A tangential line 30d' at the midpoint 14a in the centerline 30d of the core 30a of the tapered waveguide 30 is inclined at a certain angle relative to the centerline 2d of the core 2a of the straight waveguide 2.

The second straight waveguide 3, the fourth curved waveguide 11 and the tapered waveguide 30 between there are respectively formed symmetric to the first straight waveguide 2, the first curved waveguide 8 and the tapered waveguide 31 relative to the axis 1c.

Figure 5:
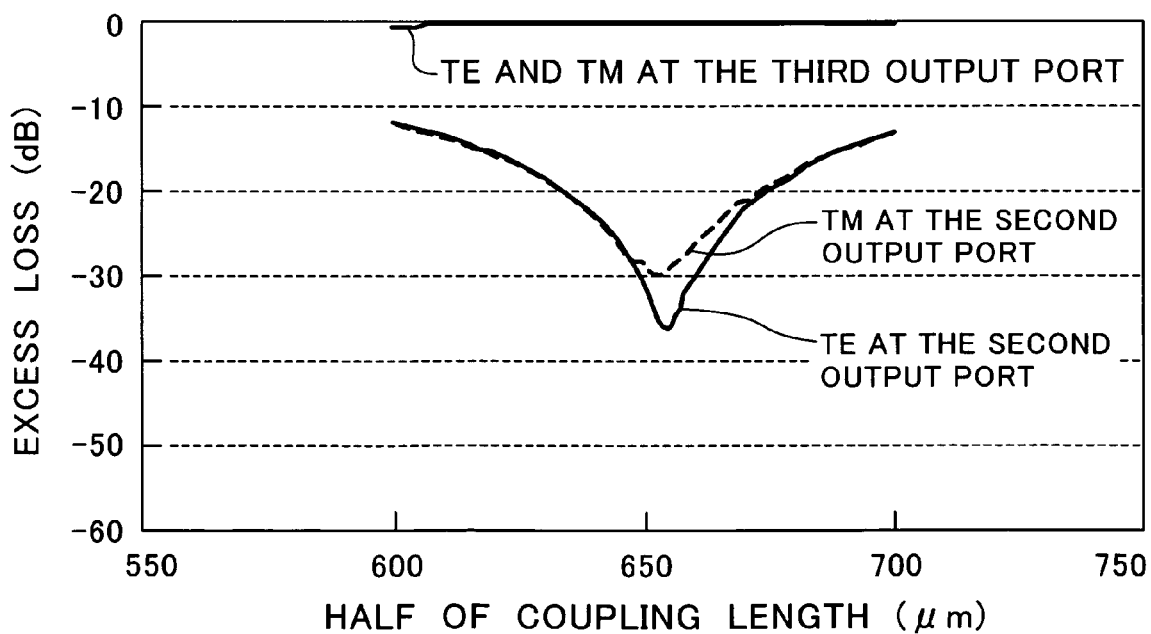
FIG. 5 is a graph showing a value of crosstalk of each of the polarized wave components in the optical directional coupler according to the present invention.

FIG. 5 is a graph showing a difference between amounts of crosstalk of the polarized wave components in the optical directional coupler according to the first embodiment of the present invention. In FIG. 5, a horizontal axis thereof indicates half of the coupling length while a vertical axis thereof indicates excess loss. FIG. 5 shows a state in which most of the light is transmitted from the first input port 8p to the third output port 10p. As can be seen from FIG. 5, respective excess losses of the polarized components TE, TM at the third output port 10p are substantially the same when the coupling length is changed. On the contrary, respective excess losses (crosstalk) of the polarized components TE, TM at the second output port 9p change when the coupling length is changed, but phases thereof substantially conform to each other. Therefore, when a coupling length is selected so that excess loss of the polarized wave component TE is minimized, excess loss of the polarized wave component TM can be minimized. As a result, the respective excess losses of the polarized components TE, TM both become smaller than −25 dB.

Figure 6:
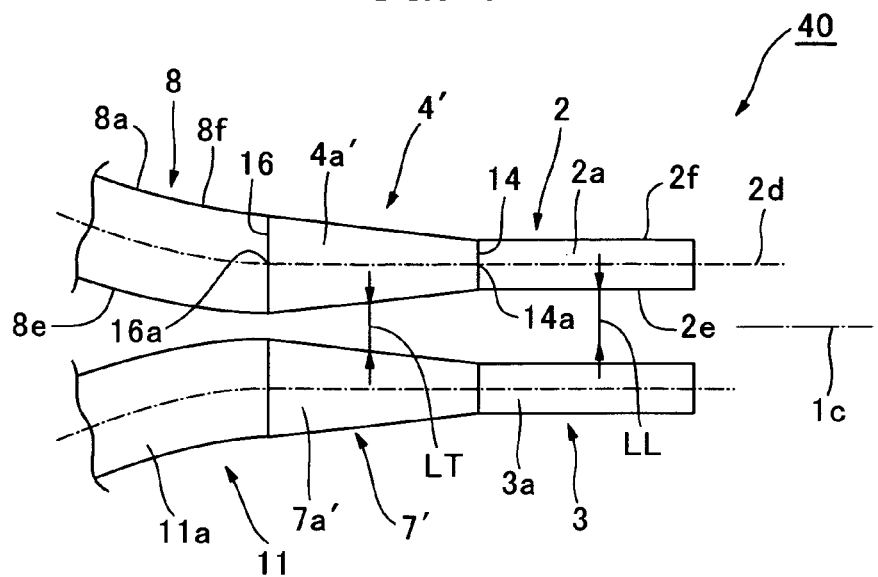
FIG. 6 is a partially expanded view of a comparative optical directional coupler.

Next, an optical directional coupler in which each tapered waveguide is symmetric relative to a centerline of a core of a straight waveguide will be explained as a comparative example compared with the optical directional coupler according to the present invention. FIG. 6 is a partially expanded view of tapered waveguides and the vicinity thereof of a comparative optical directional coupler. Comparing a comparative optical directional coupler 40 with the optical directional coupler 1 shown in FIGS. 1 and 2, the former has a structure similar to that of the latter except that the former has tapered waveguides 4'-7' (the tapered waveguides 5' and 6' are not shown in FIG. 6), each tapered waveguide being symmetric relative to the centerline 2d of the cores 2a, 3a of the straight waveguides 2, 3 (the reference number of the centerline of the core 3a is omitted in FIG. 6). A distance LT between the core 4a' of the tapered waveguide 4' and the core 7a' of the tapered waveguide 7' becomes smaller toward the first curved waveguide 8 and the fourth curved waveguide 11.

Figure 7:
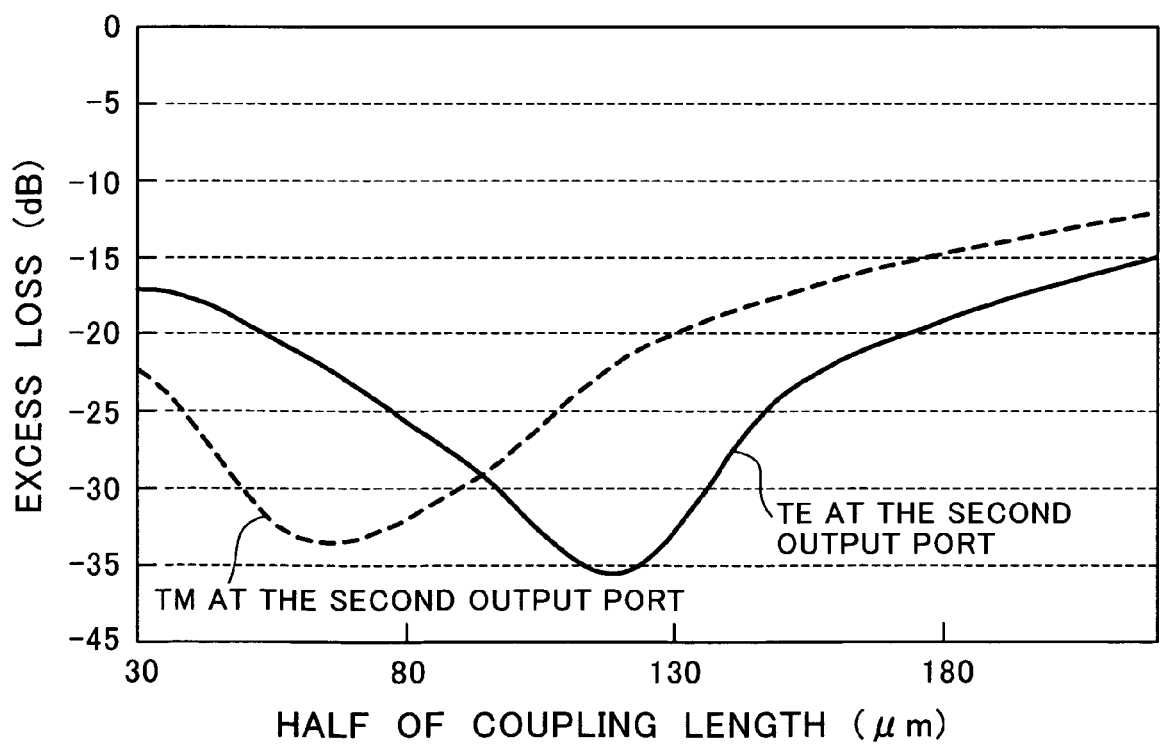
FIG. 7 is a graph showing a value of crosstalk of each of the polarized wave components in the comparative optical directional coupler.

FIG. 7 is a graph showing a difference between amounts of crosstalk of the polarized wave components in the comparative optical directional coupler. Similar to FIG. 5, a horizontal axis in FIG. 7 indicates half of the coupling length while a vertical axis thereof indicates excess loss and FIG. 7 shows a state in which most of light is transmitted from the first input port 8p to the third output port 10p. The crosstalk means an amount of light transmitted to the second output port 9p. Although sufficient number of attempts to adjust phases of the polarized components TE, TM at the second output port 9p of the comparative optical directional coupler 40 were made, as can be seen from FIG. 7, their coupling lengths were different from each other.

As stated above, in a structure in which each of the tapered waveguides 4'-7' is symmetric relative to the centerline 2d of the cores 2a, 3a of the straight waveguides 2, 3 (reference number of the centerline of the core 3a is omitted in FIG. 6), it is necessary to keep the distance LT in the width direction 1b between the core 4a' of the tapered waveguide 4' and the core 7a' of the tapered waveguide 7' great. Thus, the distance LL in the width direction 1b between the core 2a of the first straight waveguide 2 and the core 3a of the second straight waveguide 3 is greater than a distance LL calculated by using the V-parameter and the coupling coefficient K for obtaining a desired phase property. As a result, crosstalk has a property depending on the polarized waves.

The embodiments of the present invention have been explained, but the present invention is not limited to the above-mentioned embodiments and it is apparent that the embodiments can be changed within the scope of the present invention set forth in the claims.

In the above-explained embodiments, planar profiles of the tapered waveguides 4-7 are the same, but such profiles can be changed according to adjustment of the polarized components of light.

Further, in the second embodiment, the distance LT increases toward the first curved waveguide 8 and the fourth curved waveguide 11, but it can decrease toward them so long as a stable splitting ratio can be obtained.

What is claimed is:

1. An optical directional coupler comprising:
   two straight optical waveguides having respective cores extending longitudinally close to each other to form an optical coupler portion, each core of each straight optical waveguide having a centerline; and
   a tapered optical waveguide having a core connected to the core of at least one of the straight optical waveguides;
   wherein a width of the core of the tapered optical waveguide becomes narrow toward the at least one of the straight optical waveguides and a profile of the tapered waveguide is asymmetric relative to the centerline of the core of the at least one of the straight optical waveguides,
   wherein a width of the core of the straight optical waveguide and a distance between the cores of the two straight optical waveguides are determined by a V-parameter V and a coupling coefficient K,
   wherein the V-parameter V is represented by;

$$V = \frac{2\pi}{\lambda} n_1 \frac{(W2a)}{2} \sqrt{2\Delta} ; \quad \text{(equation 1)}$$

wherein the coupling coefficient K is represented by $$K = \frac{\kappa^2}{\beta} \frac{1}{\gamma \frac{(W2a)}{2}} \frac{\exp(-\gamma LL)}{1 + \left(\frac{\kappa}{\gamma}\right)^3} ; \quad \text{(equation 2)}$$

wherein K is represented by $$\kappa = \sqrt{k_0^2 n_1^2 - \beta^2} \quad \text{(equation 3);}$$

wherein γ is represented by $$\gamma = \sqrt{\beta^2 - k_0^2 n_3^2} \quad \text{(equation 4);}$$

and
   wherein λ is a wavelength of light to be transmitted, n1 is a value of refractive index of the cores, W2a is a width of the core of the straight optical waveguide, Δ is a value of relative index difference, β is a value of mode propagation constant when it is assumed that one of the two straight optical waveguides exists alone, LL is a distance between the cores of the two straight optical waveguides, $k_0 = 2\pi/\lambda$, and $n_3$ is a value of refractive index of a clad intervened between the cores of the two straight optical waveguides.

2. The optical directional coupler according to claim 1, wherein the value of V-parameter V is 0.82 and the value of coupling coefficient K is 0.0092.

3. The optical directional coupler according to claim 2, wherein at least a portion of a boundary line of the tapered optical waveguide is a straight line.

4. The optical directional coupler according to claim 2, wherein at least a portion of a boundary line of the tapered optical waveguide is a curved line.

5. The optical directional coupler according to claim 1, wherein at least a portion of a boundary line of the tapered optical waveguide is a straight line.

6. The optical directional coupler according to claim 1, wherein at least a portion of a boundary line of the tapered optical waveguide is a curved line.

7. An optical directional coupler comprising:
   first and second straight optical waveguides having respective cores extending in a longitudinal direction close to each other to form an optical coupler portion along the entire length of the first and second straight optical waveguides, each core of each straight optical waveguide having a centerline;
   a first tapered optical waveguide having a first core connected to one end of the core of the first straight optical waveguide;
   a second tapered optical waveguide having a second core connected to the other end of the core of the first straight optical waveguide;

a third tapered optical waveguide having a third core connected to one end of the core of the second straight optical waveguide on a same side of that of the second tapered optical waveguide in the longitudinal direction; and a fourth tapered optical waveguide having a fourth core connected to the other end of the core of the second straight optical waveguide;

wherein a width of each of the first and second cores, respectively of the first and second tapered optical waveguides, becomes narrow toward the first straight optical waveguide, and a profile of each of the first and second tapered optical waveguides is asymmetric relative to the centerline of the core of the first straight optical waveguide;

a width of each of the third and fourth cores, respectively of the third and fourth tapered optical waveguides, becomes narrow toward the second straight optical waveguide, and a profile of each of the third and fourth tapered optical waveguides is asymmetric relative to the centerline of the core of the second straight optical waveguide; and a combination of the first to fourth tapered optical waveguides and the first and second straight optical waveguides is symmetrical with respect to an axis extending in the longitudinal direction between the first and second straight optical waveguides.

8. The optical directional coupler according to claim 7, wherein at least a portion of each boundary line of the first to fourth tapered optical waveguides is a straight line.

9. The optical directional coupler according to claim 7, wherein at least a portion of each boundary line of the first to fourth tapered optical waveguides is a curved line.

10. The optical directional coupler according to claim 7, wherein a boundary line of each of the tapered optical waveguides is disposed on a same straight line as a boundary line of the straight optical waveguide to which each of the tapered optical waveguides is connected.

11. The optical directional coupler according to claim 7, wherein a distance between adjacent boundary lines of the first and second tapered optical waveguides is equal to or greater than a distance between adjacent boundary lines of the first and second straight optical waveguides.

12. The optical directional coupler according to claim 7, wherein a distance between adjacent boundary lines of the first and second tapered optical waveguides increases in a direction extending away from the first and second straight optical waveguides.

13. An optical directional coupler comprising:

first and second straight optical waveguides having respective cores extending in a longitudinal direction close to each other to form an optical coupler portion along the entire length of the first and second straight optical waveguides, each core of each straight optical waveguide having a centerline;

a first tapered optical waveguide having a first core connected to one end of the core of the first straight optical waveguide;

a second tapered optical waveguide having a second core connected to the other end of the core of the first straight optical waveguide;

a third tapered optical waveguide having a third core connected to one end of the core of the second straight optical waveguide on the same side of that of the second tapered optical waveguide in the longitudinal direction; and a fourth tapered optical waveguide having a fourth core connected to the other end of the core of the second straight optical waveguide;

wherein a width of each of the first and second cores, respectively of the first and second tapered optical waveguides, becomes narrow toward the first straight optical waveguide, and a profile of each of the first and second tapered optical waveguides is asymmetric relative to the centerline of the core of the first straight optical waveguide;

a width of each of the third and fourth cores, respectively of the third and fourth tapered optical waveguides, becomes narrow toward the second straight optical waveguide, and a profile of each of the third and fourth tapered optical waveguides is asymmetric relative to the centerline of the core of the second straight optical waveguide; and a combination of the first to fourth tapered optical waveguides and the first and second straight optical waveguides is symmetrical with respect to an axis which passes through the midpoints of the first and second straight optical waveguides and extends across the first and second straight optical waveguides in a width direction perpendicular to the longitudinal direction.

14. The optical directional coupler according to claim 13, wherein the combination of the first to fourth tapered optical waveguides and the first and second straight optical waveguides is symmetrical with respect to an axis extending in the longitudinal direction between the first and second straight optical waveguides.

15. The optical directional coupler according to claim 13, wherein at least a portion of each boundary line of the first to fourth tapered optical waveguides is a straight line.

16. The optical directional coupler according to claims 13, wherein at least a portion of each boundary line of the first to fourth tapered optical waveguides is a curved line.

* * * * *